US009024608B2

(12) United States Patent
Jian et al.

(10) Patent No.: US 9,024,608 B2
(45) Date of Patent: May 5, 2015

(54) LOAD-ADAPTIVE POWER GENERATOR FOR DRIVING A LOAD DEVICE

(75) Inventors: Qing-Long Jian, Shenzhen (CN); Pei-Jun Liang, Shenzhen (CN)

(73) Assignee: Integrated Solutions Technology Inc., Taipei (TW)

( * ) Notice: Subject to any disclaimer, the term of this patent is extended or adjusted under 35 U.S.C. 154(b) by 189 days.

(21) Appl. No.: 13/607,880

(22) Filed: Sep. 10, 2012

(65) Prior Publication Data

US 2013/0314065 A1 Nov. 28, 2013

(30) Foreign Application Priority Data

May 22, 2012 (CN) .......................... 2012 1 0160448

(51) Int. Cl.
G05F 1/563 (2006.01)
G05F 1/46 (2006.01)
H02M 3/156 (2006.01)
G05F 1/575 (2006.01)
H02M 1/00 (2006.01)

(52) U.S. Cl.
CPC ................. *G05F 1/46* (2013.01); *H02M 3/156* (2013.01); *H02M 2001/0032* (2013.01); *Y02B 70/16* (2013.01)

(58) Field of Classification Search
USPC ................................................ 323/282–289
See application file for complete search history.

(56) References Cited

U.S. PATENT DOCUMENTS

| 7,646,181 B2 * | 1/2010 | Cheon et al. .................. 323/268 |
| 8,148,967 B2 * | 4/2012 | Xing et al. ..................... 323/288 |
| 8,629,669 B2 * | 1/2014 | Tournatory et al. ........... 323/285 |
| 2008/0074094 A1 * | 3/2008 | Brenden et al. ............... 323/282 |
| 2008/0136388 A1 * | 6/2008 | Senda et al. ................... 323/282 |
| 2009/0009148 A1 * | 1/2009 | Philbrick ....................... 323/282 |
| 2011/0062928 A1 * | 3/2011 | Tobin et al. .................... 323/283 |
| 2012/0112721 A1 * | 5/2012 | Wu et al. ........................ 323/288 |
| 2012/0126772 A1 * | 5/2012 | Yamakoshi et al. .......... 323/284 |
| 2012/0326689 A1 * | 12/2012 | Rice ............................... 323/284 |
| 2013/0049725 A1 * | 2/2013 | Yashiki ......................... 323/282 |

FOREIGN PATENT DOCUMENTS

| CN | 101763128 A | 6/2010 |
| CN | 101931323 A | 12/2010 |
| CN | 102097924 A | 6/2011 |
| EP | 1524568 A2 | 10/2008 |
| TW | 200721647 | 6/2007 |

* cited by examiner

*Primary Examiner* — Adolf Berhane
*Assistant Examiner* — Nusrat Quddus
(74) *Attorney, Agent, or Firm* — Li & Cai Intellectual Property (USA) Office

(57) ABSTRACT

The present invention includes a load-adaptive power generator including a feedback detecting module, a load determining module, a load driving module, and a control module. The feedback detecting module detects a load voltage of a load device, and converts the load voltage into a feedback voltage. The load determining module determines whether the feedback voltage is within a preset range for generating a periodical load driving signal. The load driving module has a plurality of driving units and at least one switch. The driving units drive the load device according to the load driving signal, and at least one driving unit receives the load driving signal through the switch. The control module turns on the switch when the frequency of the load driving signal is less than a frequency threshold. Accordingly, the load-adaptive power generator of the present invention can save energy.

10 Claims, 4 Drawing Sheets

LOAD-ADAPTIVE POWER GENERATOR FOR DRIVING A LOAD DEVICE

BACKGROUND

1. Technical Field

The present disclosure relates to a load-adaptive power generator, in particular, to a load-adaptive power generator that can regulate the power output according to the power consumption of the load device.

2. Description of Related Art

Generally, the power output of a traditional power generator is fixed by the scale the designer provides or the design for specific load device, and unable to automatically change according to the magnitude of the load device. Namely, if a traditional power generator is equipped with a load device with stable power consumption, the power output of the power generator can be predetermined to be exactly equal to the maximum power that specific load device consumes so as to enable the load device work normally anytime.

Yet, actually, the power consumption of a load device may not be stable, for example, the power consumption of a central processing unit of a computer would be different according to its workload. If the traditional power generator provides every load device the same power output, there may be a waste of power resulting in decreasing power efficiency. In practice, the power consumption when a load device is working (full-load mode) would be different from the power consumption when a load device is standby (power-saving mode). Thus, a load won't be always in a full-load mode and that's why a load-adaptive power generator is needed for avoiding the waste of power.

For a power generator, a load device can be considered a heavy load when the power consumption is relatively more and a minor load when the power consumption is relatively less. Unable to adapt in above two situations, a traditional power generator can't have power used efficiently. Thus, a power generator that can automatically detect the magnitude of a load device and further regulate the power output in order to have the best power conversion efficiency, no matter the load-magnitude is large or small, is extremely needed in this field.

SUMMARY

An exemplary embodiment of the present disclosure provides a load-adaptive power generator that can automatically detect the magnitude of a load device and thus drive different amounts of the driving units so as to maintain the best power conversion efficiency of the power generator.

An exemplary embodiment of the present disclosure provides a load-adaptive power generator for driving load devices. The power generator comprises a feedback detecting module, a load determining module, a load driving module and a control module. The feedback detecting module, coupled to the load device, detects a load voltage of the load device and converts the load voltage into a feedback voltage. The load determining module, coupled to the feedback detecting module, determines whether or not the feedback voltage is within a preset range for generating a periodical load driving signal. The load driving module couples to the load determining module and comprises a plurality of driving units and at least one switch, and the driving units respectively and selectively drive the load device according to the load driving signal. The control module couples to the load determining module and the load driving module, receives the load driving signal and determines the frequency of the load driving signal, wherein if the frequency of the load driving signal is less than a frequency threshold the control module turns on the switch.

According to one exemplary embodiment of the present disclosure, each driving unit is a gate driver and the load driving signal drives a n-channel metal oxide semiconductor (NMOS) and a p-channel metal oxide semiconductor (PMOS) respectively. Besides, the gate drivers at least comprise two different scales of the n-channel metal oxide semiconductor and the p-channel metal oxide semiconductor, respectively.

According to another exemplary embodiment of the present disclosure, the control module comprises at least one frequency comparator for receiving a predetermined clock and the load driving signal, and determining whether or not the frequency of the load driving signal is less than the frequency of the predetermined clock. If the frequency of the load driving signal is less than the frequency of the predetermined clock, the control module turns on the switch, wherein the control module generates the frequency threshold according to the predetermined clock.

To sum up, the load-adaptive power generator of this invention can detect the magnitude of a load device, heavy or minor. If the frequency of the load driving signal is less than the frequency of the predetermined clock, then the load-adaptive power generator would consider it a heavy load, and if the frequency of the load driving signal is more than the frequency of the predetermined clock, then the load-adaptive power generator would consider it a minor load. Accordingly, the load-adaptive power generator of this invention can turn the switch on so that more driving units receive a load driving signal and begin to work when the load-magnitude of a load is large. Therefore, the load-adaptive power generator of this invention can adaptively regulate the power output and thus have the best power conversion efficiency, no matter the load-magnitude is large or small.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
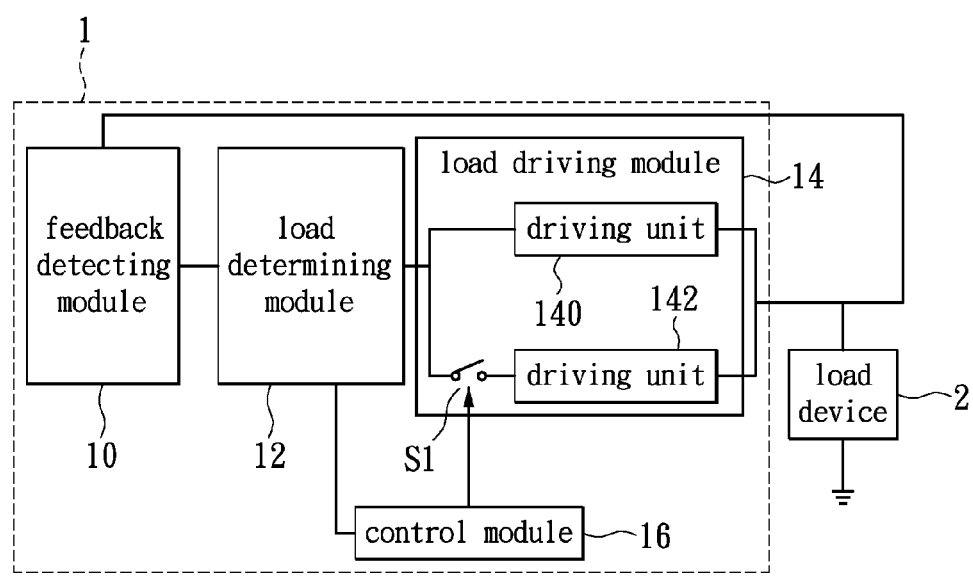
FIG. 1 is a function block diagram of a power generator of an embodiment of this invention.

Reference will now be made in detail to the exemplary embodiments of the present disclosure, examples of which are illustrated in the accompanying drawings. Wherever possible, the same reference numbers are used in the drawings and the description to refer to the same or like parts.

(An Embodiment of the Load-Adaptive Power Generator of this Invention.)

Figure 2:
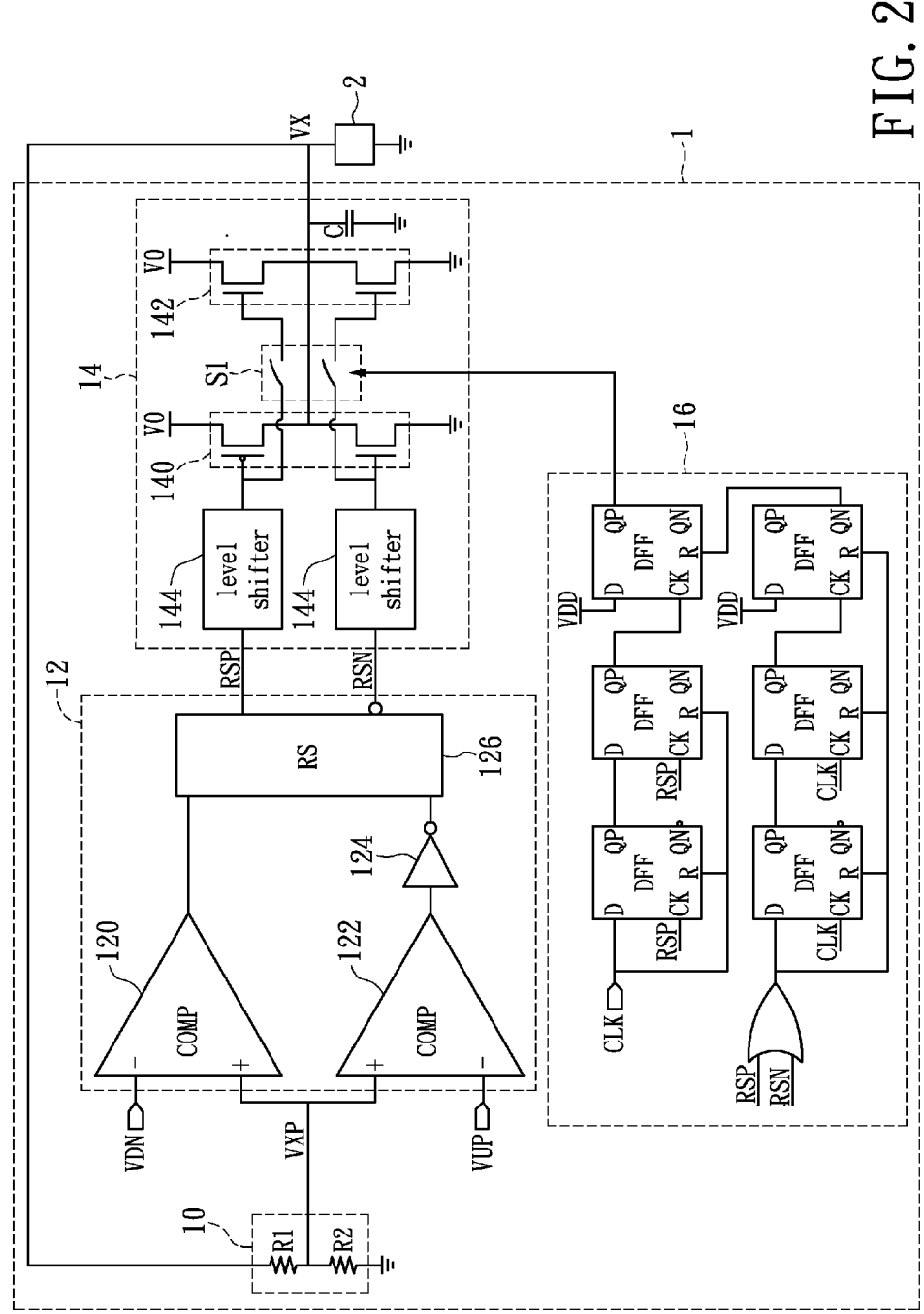
FIG. 2 is an electrical schematic drawing of a power generator of an embodiment of this invention.

Please refer to FIG. 1 and FIG. 2. FIG. 1 is a function block diagram of a power generator of an embodiment of this invention and FIG. 2 is an electrical schematic drawing of a power generator of an embodiment of this invention. As shown in figures, a power generator 1 is for driving at least one load device 2, and comprises a feedback detecting module 10, a load determining module 12, a load driving module 14, and a control module 16. The feedback detecting module 10 and the load driving module 14 are respectively coupled to the load device 2, the load determining module 12 is coupled to the feedback detecting module 10 and the control module 16. Despite being coupled to the load device 2, the load driving module 14 is further coupled to the control module 16. The detailed description about each element is as follow.

The feedback detecting module 10 is for detecting a load voltage VX of the load device 2 and converting the load voltage VX into a feedback voltage VXP. In practice, the feedback detecting module 10 is a group of resistors in series (R1 and R2), simply divides the load voltage VX and generates the feedback voltage VXP. Herein, the feedback detecting module 10 is for feeding the load voltage VX in the power generator 1 and, additionally, can lower the load voltage VX so that the feedback voltage VXP can be within a low-voltage range. For instance, when the load voltage VX is within a range of roughly 5V or over 5V (High-voltage Level), the user can customize the resistors (R1 and R2) so as to have the divided feedback voltage VXP be within a range of roughly 3V or under 3V (Low-voltage Level). By lowering voltage, the working voltage range and the phase margin of the power generator 1 of this invention can be elevated. However, there's no intention to limit the feedback detecting module 10 to the resistors in series (R1 and R2), and the skilled in the art can customize suitable bleeder circuits.

The load determining module 12 is for determining whether or not the feedback voltage VXP is within a preset range for generating periodical load driving signals (RSP and RSN). In practice, the feedback voltage VXP generated by the feedback detecting module 10 feeds in comparators 120, 122 (the first comparator, the second comparator) of the load determining module 12. More precisely, the feedback voltage VXP respectively feeds in the positive input ends of the comparators 120, 122 (the first comparator, the second comparator), and the predetermined voltage thresholds VDN, VUP (the first voltage threshold and the second voltage threshold) respectively feeds in the negative input ends of the comparators 120, 122, so that the comparators 120, 122 can respectively output their comparison results.

In practice, the load determining module 12 comprises an inverter 124 coupled at the output end of the comparator 122 and a trigger 126 such as a RS trigger. As shown in FIG. 2, the trigger 126 can receive the comparison result outputted by the comparator 120 and the inverted comparison result outputted by the comparator 122, and then output the periodical load driving signals (RSP and RSN).

More detailed, the comparator 120 compares the feedback voltage VXP and the feedback voltage VXN. When the feedback voltage VXP is within the range (the feedback voltage VXP is larger than the voltage threshold VDN), the comparison result generated by the comparator 120 is at the high-voltage level and so are the load driving signals (RSP and RSN). When the feedback voltage VXP is gradually lowering due to discharging, and is over discharged, the feedback voltage VXP would be less than the voltage threshold VDN. At this moment, the comparison result generated by the comparator 120 would be switched to be at low-voltage level and so are the load driving signals (RSP and RSN).

On the other hand, the comparator 122 compares the feedback voltage VXP and the feedback voltage VUP. When the feedback voltage VXP is within the range (the feedback voltage VXP is less than the voltage threshold VUP), the comparison result generated by the comparator 122 is at the low-voltage level but at high-voltage level after reversing phase by the inverter 124 and so are the load driving signals (RSP and RSN). When the feedback voltage VXP is gradually elevating due to charging, and is even over charged, the feedback voltage VXP would be higher than the voltage threshold VUP. At this moment, the comparison result generated by the comparator 122 would be switched to be at high-voltage level but at low-voltage level after reversing phase by the inverter 124 and so are the load driving signals (RSP and RSN).

Therefore, when the feedback voltage VXP is periodically less than the voltage threshold VDN or higher than the voltage threshold VUP, the periodical load driving signals RSP, RSN would be generated. The voltage threshold VDN can be considered the minimum value of the predetermined voltage range and the voltage threshold VUP can be considered the maximum value of the predetermined voltage range.

The load driving module 14 comprises a plurality of driving units 140, 142, a switch S1 and a filter capacitor C. The driving units 140, 142 selectively drive the driving load device 2 according to the load driving signals RSP, RSN and the filter capacitor C can deduce the interference affecting the driving load device 2. As shown in figures, the driving unit 140 directly receives the load driving signals RSP, RSN; however, the driving unit 142 receives the load driving signals RSP, RSN through the switch S1. In practice, the load driving module 14 further comprises a group of level shifters (LS) 144 which respectively receive the load driving signals RSP, RSN the load determining module 12 outputs, and output the shifted load driving signals RSP, RSN to the driving units 140, 142 after shifting the voltage levels of the load driving signals RSP, RSN.

In practice, the driving units 140, 142 can be gate drivers and the load driving signal RSP is for driving the n-channel metal oxide semiconductor of the gate drivers and the load driving signal RSN is for driving the p-channel metal oxide semiconductor of the gate drivers. Herein, the n-channel metal oxide semiconductor of the driving units 140 and 142 are controlled by the same load driving signal RSP. What's different is that the n-channel metal oxide semiconductor of the driving units 140 can directly receive the load driving signal RSP (or the shifted load driving signal RSP) but the n-channel metal oxide semiconductor of the driving unit 142 determines whether or not to receive the load driving signal RSP via the switch S1. As the same, the p-channel metal oxide semiconductor of the driving units 140 can directly receive the load driving signal RSN (or the shifted load driving signal RSN) but the n-channel metal oxide semiconductor of the driving unit 142 determines whether or not to receive the load driving signal RSN via the switch S1.

To be noted, there's no intention to limit the scale of the re-channel and p-channel metal oxide semiconductors of the driving units 140 and 142. For example, the n-channel and p-channel metal oxide semiconductors of the driving unit 140 can be slightly smaller than the n-channel and p-channel metal oxide semiconductors of the driving unit 142 so that the driving unit 142 can have a stronger driving ability to the load device 2. For sure, the skilled in the art can customize the scale of the n-channel and p-channel metal oxide semiconductors based on the needs of the load device 2.

Practically speaking, the control module 16 can comprise a group of comparators determining the magnitude (the heavy load with more power consumption or the minor load with less power consumption) of the load device 2 based on the frequency of the load driving signals RSP, RSN. If the control module 16 determines that the frequency of the load driving signals RSP, RSN is less than the frequency of the predetermined clock CLK, it would further determine that the load device 2 is a heavy load hard to be over-charged and over-discharged, and thus needs to turn on the switch S1 to have two driving units 140, 142 work simultaneously for providing power the load device 2 needs. On the other hand, if the control module 16 determines that the frequency of the load driving signals RSP, RSN is more than the frequency of the predetermined clock CLK, it would further determine that the load device 2 is a minor load easy to be over-charged and over-discharged, and thus needs to turn off the switch S1 to only have the driving unit 140 work with the driving unit standby for providing power the load device 2 needs.

As mentioned above, when the scale of the n-channel and p-channel metal oxide semiconductors of the driving units 140 is designed to be smaller than the scale of the n-channel and p-channel metal oxide semiconductors of the driving units 142, the load device 2 is a minor load and this invention can use the smaller driving unit 140 to provide less but enough power to avoid the waste of power. When the load device 2 is a heavy load, this invention would have the smaller driving unit 140 and the bigger driving unit 142 work simultaneously for providing enough power to the load device 2 as so to make the power regulation flexible.

(Another Embodiment of the Load-Adaptive Power Generator of this Invention.)

Figure 3:
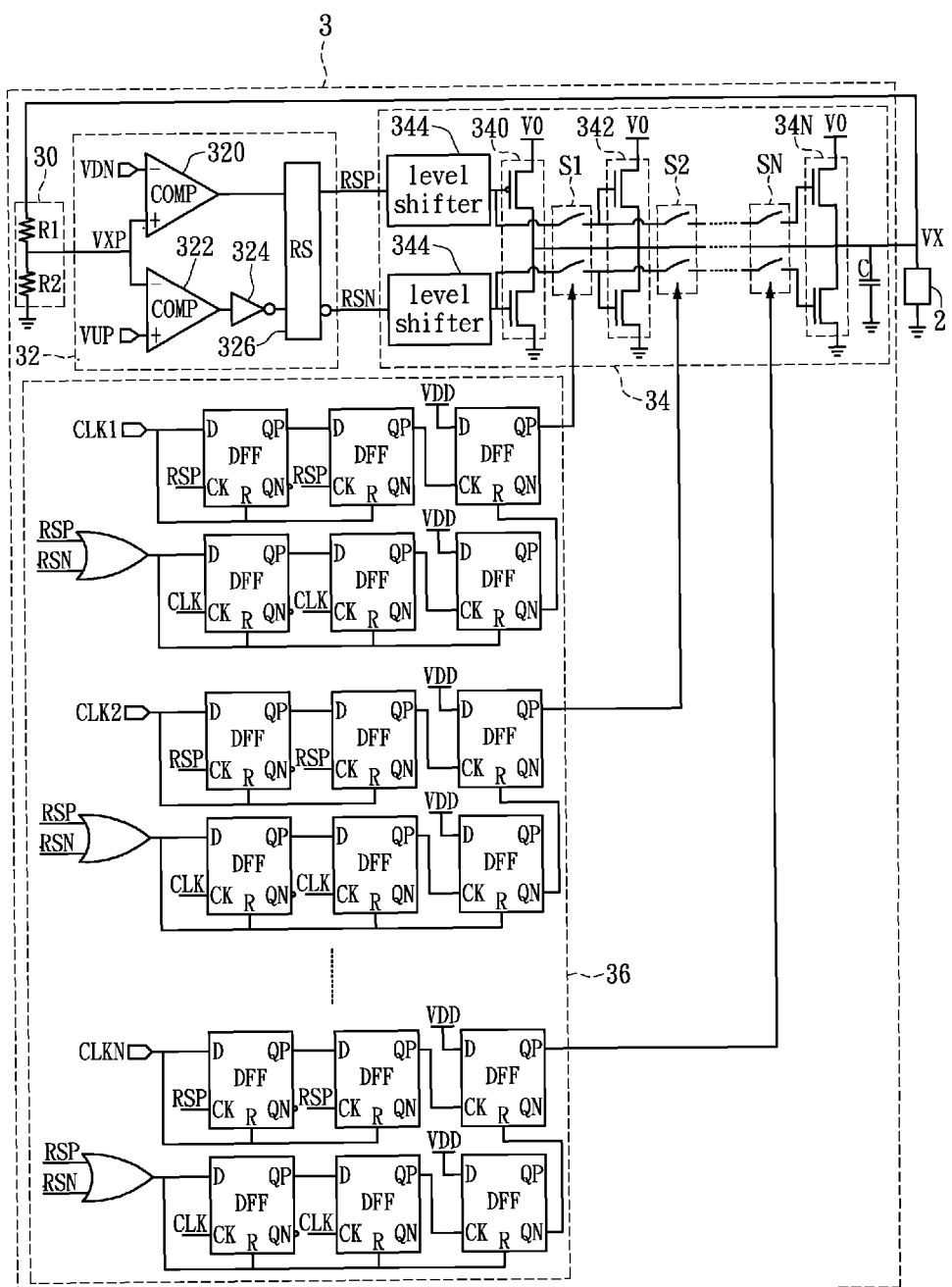
FIG. 3 is an electrical schematic drawing of a power generator of another embodiment of this invention.

Without doubt, there's no intention to limit the amount of the driving unit in the load driving module 14 shown in FIG. 1 and FIG. 2. Please refer to FIG. 3. FIG. 3 is an electrical schematic drawing of a power generator of another embodiment of this invention. As shown in FIG. 3, a power generator 3 also comprises a feedback detecting module 30, a load determining module 32, a load driving module 34 and a control module 36. Same as the above embodiment shown in FIG. 2, the feedback detecting module 30 and the load determining module 32 are not changed so herein there's no necessary explanation to give further. Yet, the difference from the above embodiment shown in FIG. 2 is that the load driving module 34 shown in FIG. 3 comprises more than two driving units, for instance, there can be many groups of driving units 340, 342, ..., 34N and many groups of switches S1, S2, ..., SN and the switches S1, S2, ..., SN can be controlled respectively by a plurality of comparators of the control module 36.

That is, the load driving module 34 of this embodiment can comprise (N+1) driving units and N switches, the first driving unit (such as 340 shown in FIG. 3) of the (N+1) driving units (such as 340, 342, ..., 34N shown in FIG. 3) directly couples to a group of level shifters 344 and the $(i+1)_{th}$ driving unit of (such as one of 342~34N shown in FIG. 3), via the $i_{th}$ switch of the N switches (such as one of S1~SN shown in FIG. 3), couples to the group of level shifters 344 for receiving the shifted load driving signals RSP, RSN.

In practice, the control module 35 comprises a plurality of groups of comparators and each group of comparator is for receiving different predetermined clocks (such as predetermined clocks CLK1, CLK2, ..., CLKN) so that the load driving signals RSP, RSN can be compared with the plurality of groups of predetermined clock CLK1, CLK2, ..., CLKN to have the frequency of the load driving signals RSP, RSN can be more accurately determined. Regarding the aspect of function, the power consumption of the load device 2 can be directly reflected by the frequency of the load driving signals RSP, RSN so the state of power consumption of the load device 2 can be more accurately determined so that the control module 36 can turn on the exact amount of switches to have the driving unit work and thus the power can be more efficiently provided to the load device 2.

(Another Embodiment of the Load-Adaptive Power Generator of this Invention.)

Figure 4:
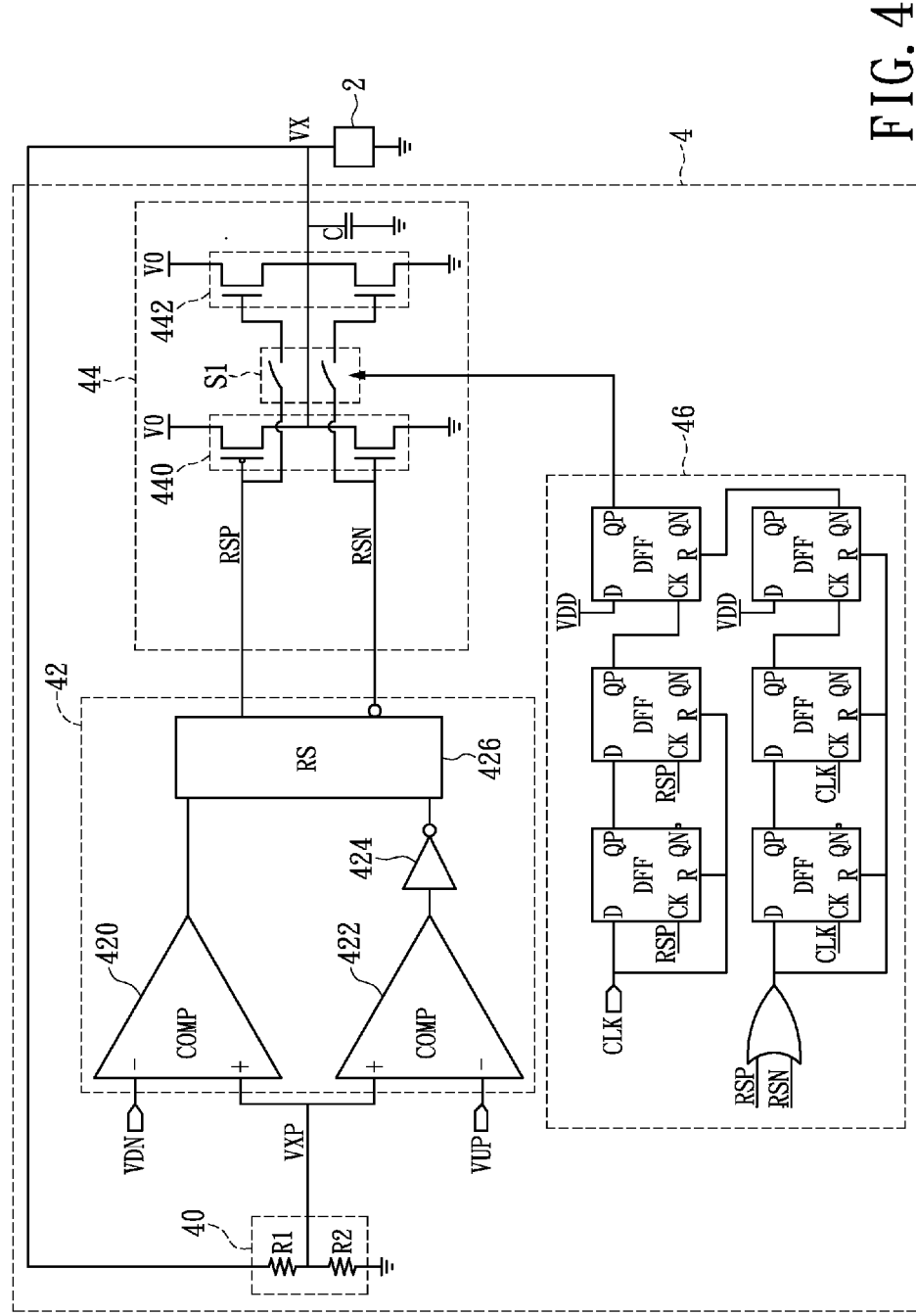
FIG. 4 is an electrical schematic drawing of a power generator of another embodiment of this invention.

Please refer to FIG. 4. FIG. 4 is an electrical schematic drawing of a power generator of another embodiment of this invention. As shown in FIG. 4, a power generator 4 also comprises a feedback detecting module 40, a load determining module 42, a load driving module 44 and a control module 46. Same as the power generator 1 shown in FIG. 2, the feedback detecting module 40, the load determining module 42 and the control module 46 are not changed so herein there's no necessary explanation to give further. Yet, the difference from the power generator 1 shown in FIG. 2 is that, the load driving module 44 doesn't comprise level shifters.

For example, in the power generator 1 shown in FIG. 2, if the needed working voltage of the load device 2 is higher, the voltage of the load driving module 14 needs to be elevated to drive the load device 2. Thus, the level shifter is essential. Practically speaking, the load voltage VX of the load device 2 is roughly at 5V, and after being divided by the feedback detecting module 10 the load determining module 12 can receive the feedback voltage VXP under 3V. Herein, the load driving module 14 can be considered a high voltage (HV) module, and the load determining module 12 and the control module 16 can be considered low voltage (LV) modules.

On the other hand, as shown in FIG. 4, if the needed working voltage of the load device 2 is lower, the load voltage VX of the load device 2 is originally under 3V so that the load determining module 42, the load driving module 44 and the control module 46 are all low voltage (LV) modules and thus it's unnecessary to design level shifters. Known from this embodiment, there's no intention to limit which voltage range the load device 2 works within, a high voltage range or a low voltage range, so that the skilled in the art can determine whether or not to have level shifters to enlarge the application range of the power generator this invention disclosed.

In summary, the power generator provided by this invention can determine a suitable voltage range via the load determining module, and then compare the feedback voltage the feedback detecting module extracts and the maximum and minimum voltages of the mentioned determined voltage range, so as to generate corresponding load driving signal by the load determining module. After that, the control module can determine the magnitude of the load device according to the frequency of the load driving signal. If the frequency of the load driving signal is less than the frequency of the predetermined clock, the control module considers the load device a heavy load. If the frequency of the load driving signal is more than the frequency of the predetermined clock, the control module considers the load device a minor load. Accordingly, when the load device is considered a heavy load, the power generator of this invention can turn on the switch to have more driving units receive the load driving signal and start to work. Therefore, the power generator of this invention can adaptively regulate the power output so that the best power conversion efficiency can be obtained no matter the load-magnitude of the load device is large or small.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A load-adaptive power generator for driving a load device, comprising:
   a feedback detecting module, coupled to the load device, for detecting a load voltage of the load device and converting the load voltage into a feedback voltage;
   a load determining module, coupled to the feedback detecting module, for determining whether or not the feedback voltage is within a preset range for generating a periodical load driving signal;
   a load driving module, coupled to the load determining module, having a plurality of driving units and at least one switch, and the driving units respectively and selectively driving the load device according to the load driving signal, wherein at least one of the driving units receives the load driving signal through the at least one switch; and
   a control module, respectively coupled to the load determining module and the load driving module, for receiving the load driving signal and determining the frequency of the load driving signal;
   wherein if the frequency of the load driving signal is less than a frequency threshold, the control module turns on the switch.

2. The load-adaptive power generator according to claim 1, wherein each driving unit is a gate driver and the load driving signal drives a n-channel metal oxide semiconductor (NMOS) and a p-channel metal oxide semiconductor (PMOS) respectively.

3. The load-adaptive power generator according to claim 2, wherein the gate drivers at least comprise two different scales of the n-channel metal oxide semiconductor and the p-channel metal oxide semiconductor, respectively.

4. The load-adaptive power generator according to claim 1, wherein the control module comprises at least one frequency comparator for receiving a predetermined clock and the load driving signal, and determining whether or not the frequency of the load driving signal is less than the frequency of the predetermined clock,
   wherein if the frequency of the load driving signal is less than the frequency of the predetermined clock, the control module turns on the switch and the control module generates the frequency threshold according to the predetermined clock.

5. The load-adaptive power generator according to claim 1, wherein the load determining module comprises a first comparator and a second comparator outputting a first comparison result and a second comparison result respectively,
   wherein the feedback voltage is respectively received by the positive input end of the first comparator and the positive input end of the second comparator, and a predetermined first voltage threshold and a predetermined second voltage threshold are respectively received by the negative input end of the first comparator and the negative input end of the second comparator.

6. The load-adaptive power generator according to claim 5, wherein the load determining module further comprises a trigger for outputting the load driving signal according to the received first comparison result and the received inverted second comparison result.

7. The load-adaptive power generator according to claim 6, wherein the load driving module further comprises at least one level shifter for regulating the voltage level of the load driving signal and outputting the load driving signal to the driving units.

8. The load-adaptive power generator according to claim 7, wherein the load driving module comprises (N+1) driving units and N switches, and the first driving unit of the (N+1) driving units is directly coupled to the level shifter, and the $(i+1)_{th}$ driving unit of the (N+1) driving units, coupled to the level shifter through the $i_{th}$ switch of the N switches, receives the shifted load driving signal,
   wherein N and i are both positive integers, and i isn't bigger than N.

9. The load-adaptive power generator according to claim 8, wherein the N switches are coupled in series.

10. The load-adaptive power generator according to claim 9, wherein the control module comprises N frequency comparators for one-to-one controlling the corresponding N switches, and the $i_{th}$ frequency comparator of the N comparators receives the $i_{th}$ predetermined clock of the N predetermined clocks and the load driving signal, and determines whether or not the frequency of the load driving signal is less than the frequency of the $i_{th}$ predetermined clock,
   wherein if the frequency of the load driving signal is less than the frequency of the $i_{th}$ predetermined clock, the control module turns on the $i_{th}$ switch of the N switches.

* * * * *